United States Patent
Hill

Patent Number: 5,351,435
Date of Patent: Oct. 4, 1994

[54] DEVICE TO FACILITATE REMOVAL OF JUVENILE AND FEMALE CRABS FROM THE INSIDE OF CRAB TRAPS AND METHOD OF USE THEREOF

[76] Inventor: Robert Hill, 2806 Telequana No. 1, Anchorage, Ak. 99517

[21] Appl. No.: 80,197

[22] Filed: Jun. 22, 1993

[51] Int. Cl.⁵ .............................................. A01K 69/00
[52] U.S. Cl. ......................................... 43/100; 43/102
[58] Field of Search ................. 43/100, 101, 102, 103, 43/104, 105, 106

[56] References Cited

U.S. PATENT DOCUMENTS

| | | | |
|---|---|---|---|
| 2,119,828 | 6/1938 | Nordenstam | 43/100 |
| 4,184,283 | 1/1980 | Wyman | 43/102 |
| 4,221,071 | 9/1980 | Sjolund | 43/100 |
| 5,088,230 | 2/1992 | Moritz | 43/102 |
| 5,168,653 | 12/1992 | Wyman et al. | 43/100 |

*Primary Examiner*—P. Austin Bradley
*Assistant Examiner*—Chuck Y. Mah
*Attorney, Agent, or Firm*—Michael J. Tavella

[57] ABSTRACT

A device that prevents female and juvenile crabs from becoming stuck in the upper portions of a crab trap is disclosed. In crab traps using angled tunnels, the upper portions of the trap provide a place for the young crab to hide from the larger males. Once in this area, however, the crab are difficult to remove. Many are often killed or injured during removal. To prevent this problem, a formed perforated shield is attached in the wedge-shaped area formed between the inside of the tunnel and the top of a crab trap. Two types of shields are disclosed. The first is an angled shield that conforms to the shape of the upper tunnel and the top of the trap. The shield fits into this wedge-shaped area to provide a smooth surface that makes it impossible for the crabs to find a place to secure a hold. The second device is simply a perforated, flat shield that fits across the space formed by the tunnel and the top of the trap. The shield has contoured ends to conform to the exact space being blocked. Both shields are attached to the crab pot using electrical wire ties placed through holes formed in the shields. Once the trap is returned to the surface, the crab located in the wedge portion (in the case of the first type shield) are simply dumped out, having no place to cling. In the second case, the crab cannot get stuck in the wedge portion and are thus readily removed from the trap. The shields can be made from any saltwater impervious material such as fiberglass plastics, or corrosion resistant or treated metal.

12 Claims, 5 Drawing Sheets

DEVICE TO FACILITATE REMOVAL OF JUVENILE AND FEMALE CRABS FROM THE INSIDE OF CRAB TRAPS AND METHOD OF USE THEREOF

This invention relates to devices used to facilitate removal of juvenile and female crabs from the inside of crab traps.

BACKGROUND OF THE INVENTION

Many types of crab traps are in use today. Such devices are commonly called crab pots in the industry. A particularly effective type of crab pot is that shown in U.S. Pat. No. 4,075,779 to Olafson. This crab pot uses a box structure to form the body of the pot. Crabs are led to bait which is suspended in the center of the trap through two angled tunnels. One inside the trap, the crabs are unable to climb back through the tunnel entrance. When the crab pot is returned to the deck of the ship, a side door is opened and the trap can then be dumped. The design of this pot, however, permits juvenile and smaller female crabs to migrate to the top of the pot, where they hide from the larger males. These crabs become attached to the netting and become stuck in the upper tunnel or wedge portion of the pot. On deck, a mate must crawl into the trap, as part of the rebaiting process, and pull these crab out of the trap. Often, crabs are injured in this process, many so severely that they later die. Even if these crabs are removed without injury, it is a time consuming process.

The present invention overcomes this problem by eliminating any surfaces for these crab to attach to. The invention consists of a plastic or fiberglass wing that is shaped to match the top of the tunnel entrance in the pot. The wedge is secured to the pot using plastic zip ties, commonly used to bundle electrical wires. Once in place, the slick plastic surface does not afford any place for the crabs to grab. Even if they are able to remain in the upper portion of the pot, they will be quickly shaken out when the pot is dumped. The device has a number of slots cut horizontally in it to permit water to pass, thereby easing its movement through the water.

DETAILED DESCRIPTION OF THE INVENTION

Figure 1:
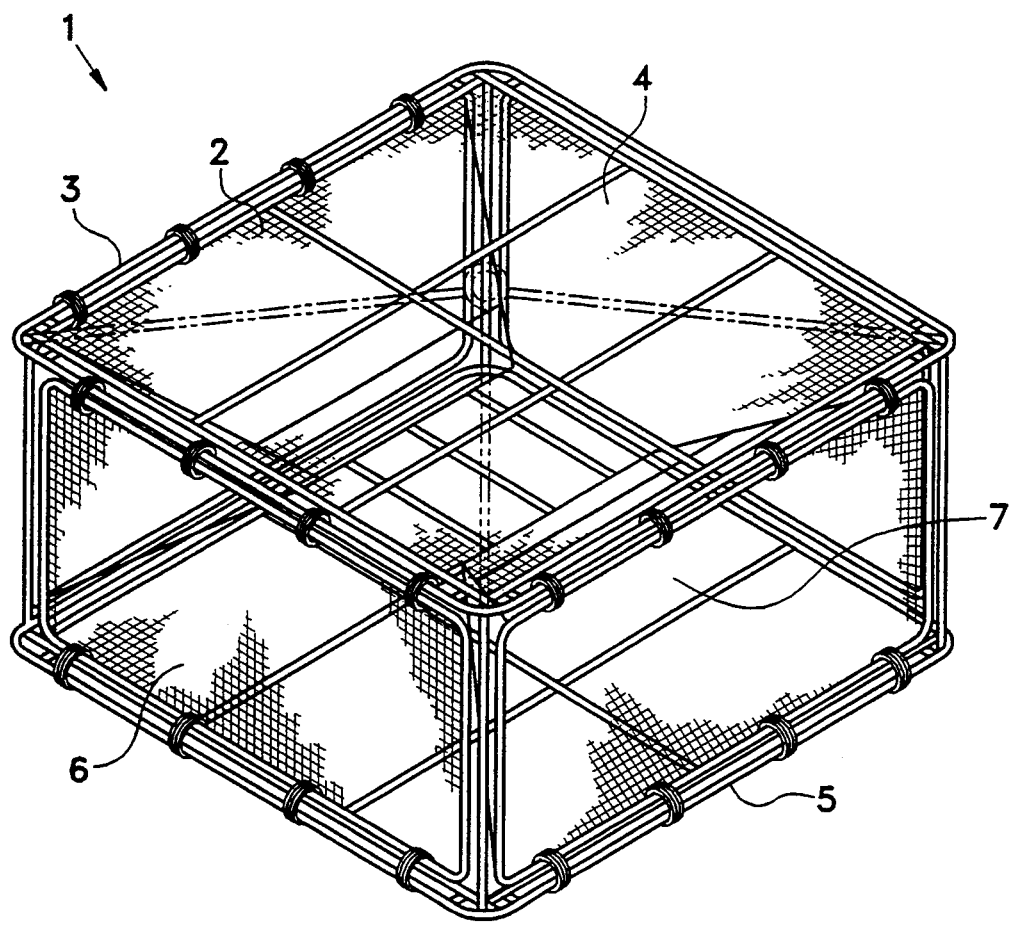
FIG. 1 is a perspective view of the Olafson device.
Figure 2:
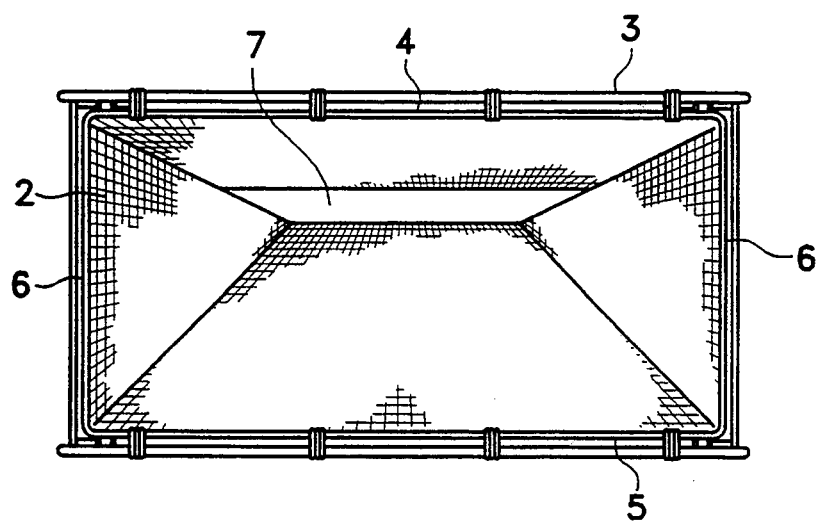
FIG. 2 is an end view of the Olafson device showing the trap tunnel.
Figure 3:
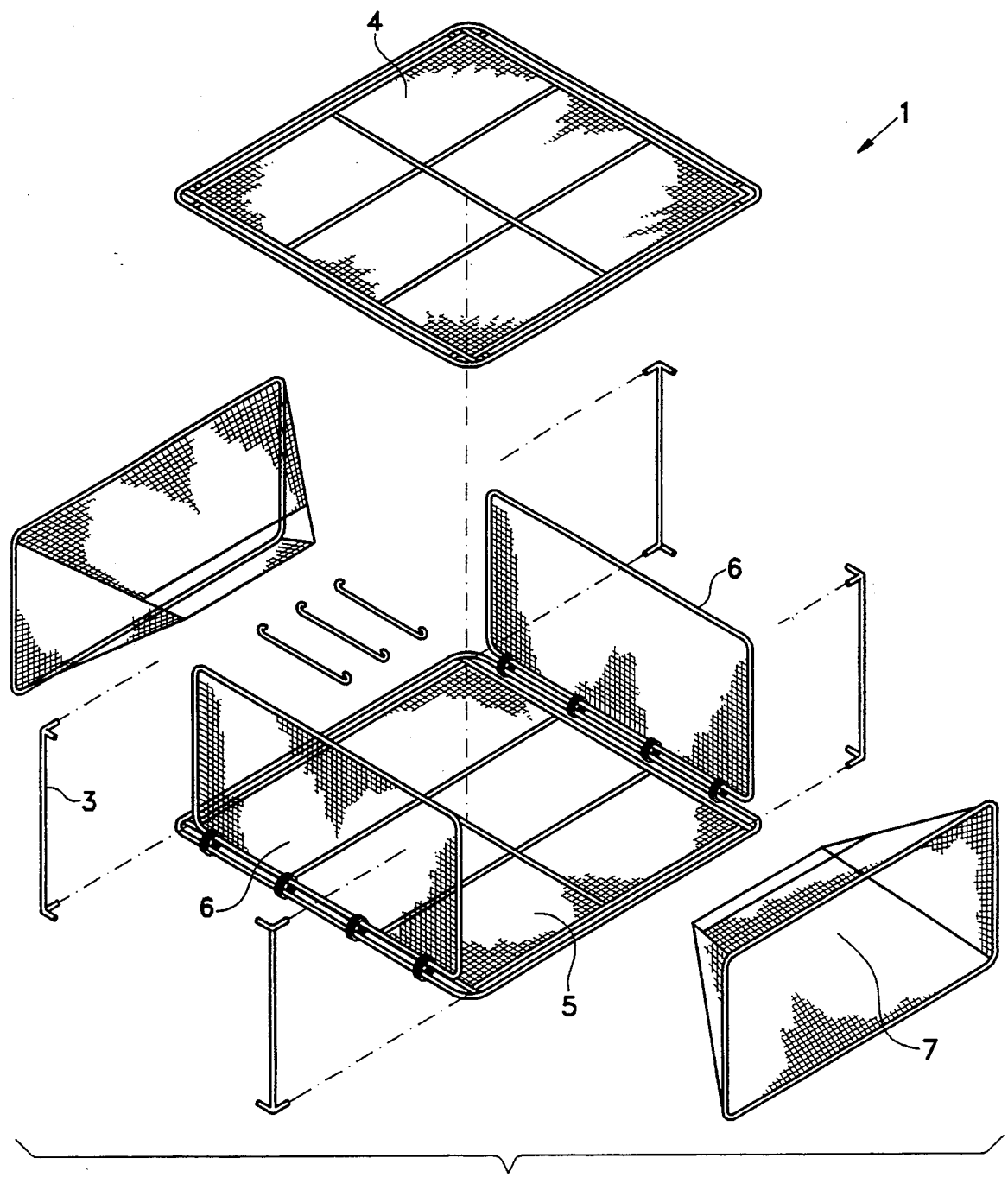
FIG. 3 is an exploded view of the shape of the Olafson device, showing the angled shape of the inner tunnel.
Figure 4:
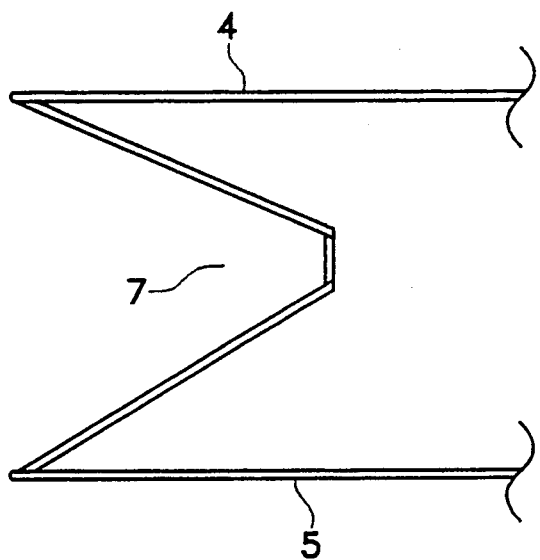
FIG. 4 is a representational drawing of the shape of the tunnel from a side view.
Figure 5:
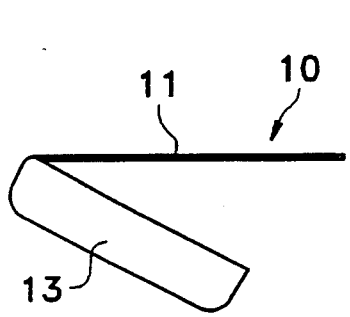
FIG. 5 is a side view of the first embodiment of the invention.

Referring now to the figures, and more particularly to FIGS. 1-3, aspects of the Olafson crab pot are shown. This device is described in U.S. Pat. No. 4,075,779, which is incorporated herein by reference. The Olafson crab pot 1 is shaped like a box. It is made out of mesh netting 2 that is secured to a metal frame 3. The trap has a top 4 and bottom 5 and two flat sides 6 that are disposed on opposite sides of the pot. The other two sides consist of an opposing pair of tunnel entrances 7. These tunnel entrances are trapezoidal in shape and are designed to lead the crab into the trap at the center of the end of the tunnel (see FIGS. 2 and 3). FIG. 4 is a representation view that shows the angular shape created by the tunnel 7 and the top 4 and bottom 5 of the frame. This angular portion of the pot that is formed by the tunnel wall and the top of the pot tunnel is a natural hiding place for juvenile and female crabs. Once the crabs reach this zone they will remain even after the pot is shaken. Most often, a crew member must enter the trap and remove these crab by hand. Although the goal is to preserve as many of these crab as possible, in most operations, many are killed or severely injured. The process of cleaning, baiting and launching a pot must be done with speed. Such speed does not allow for careful removal of the younger crab.

Figure 8:
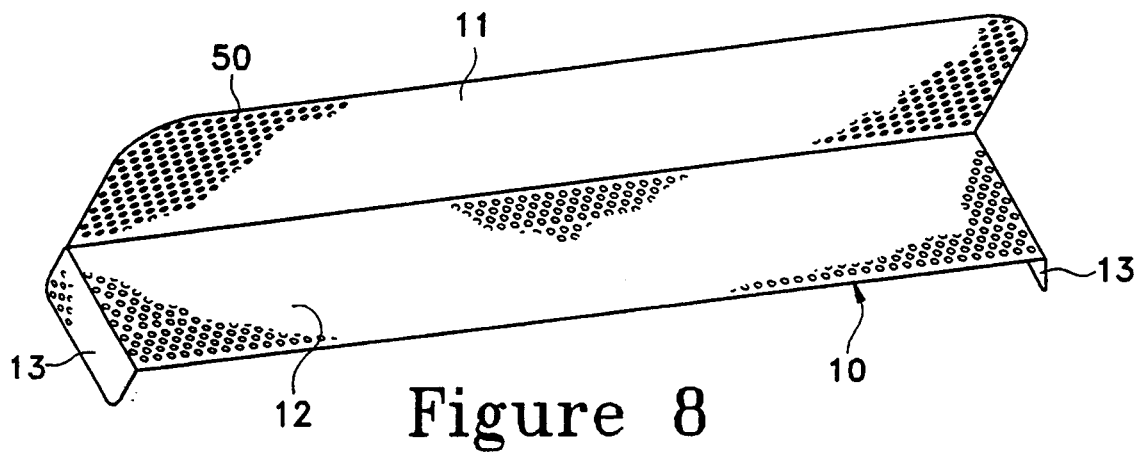
FIG. 8 is a perspective view of the first embodiment of the invention.
Figure 9:
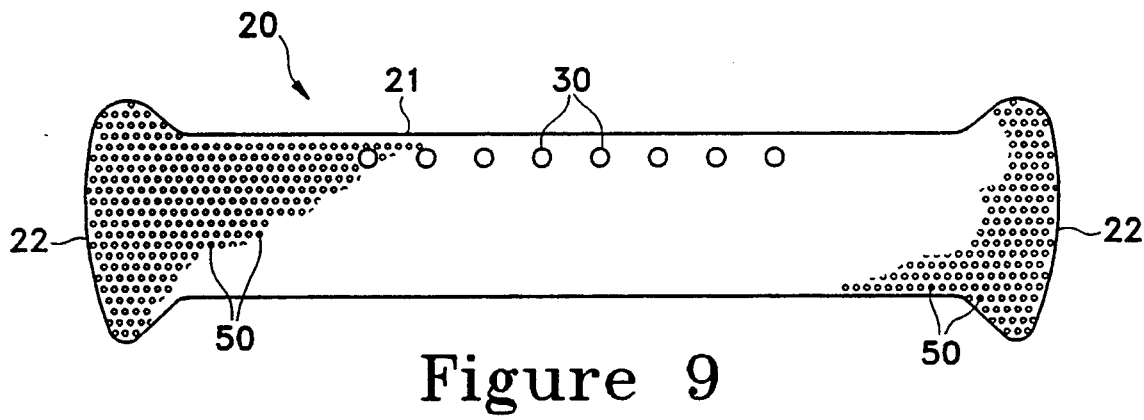
FIG. 9 is a front view of the second embodiment.
Figure 10:
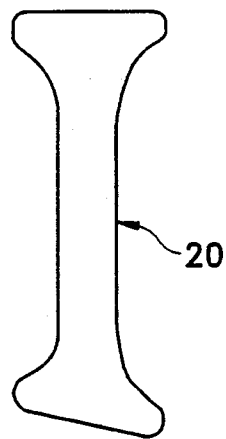
FIG. 10 is a side view of the second embodiment.

The present invention solves this problem by preventing the crab from securing themselves to the netting. There are two basic designs to accomplish this. In the preferred embodiment, a wing or sleeve 10 is placed into the area formed by the tunnel and the top of the pot. This wing must be perforated or slotted to permit water to pass through and can be formed from plastic, fiberglass or a corrosion resistant metal. It is intended that the wing is made from a light material. Also, the material must be slick to prevent the crab from attaching themselves to it. The slick surface also makes it easy to remove these crabs during the normal cleaning operation. The crabs just slide out on the wing. The second embodiment of the invention 20 is a shown in FIGS. 8 and 9 and 10. This embodiment acts as a wall to block access to the angular area. It is placed across the opening formed by the tunnel entrance and the top of the pot. This wall is angled to match the contours and shape of this opening. Although this device works well, it has the limitation of reducing the overall volume of the pot available to hold crab. It also is not shaped to permit easy removal of the crab as with the preferred embodiment discussed above.

Figure 6:
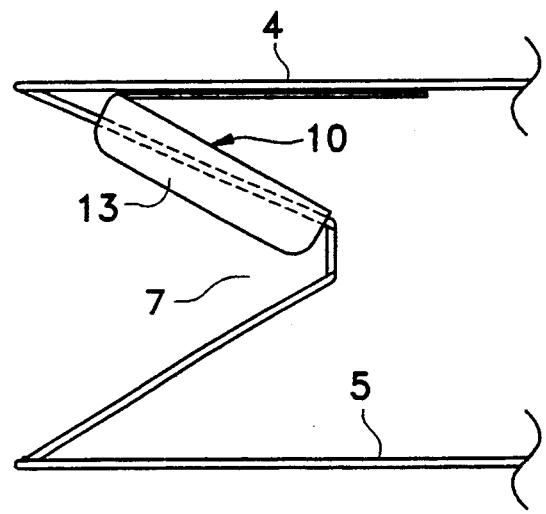
FIG. 6 is a representational view of the first embodiment installed in a crab trap.

The preferred embodiment 10 is formed from a single piece of fiberglass, plastic or a corrosion resistant metal. It has an upper flat portion 11 and a lower angled portion 12. Two curved extensions 13 extend from the lower angled portion 12 as shown. FIG. 6 illustrates how the device fits within the top part of a crab pot.

Figure 7:
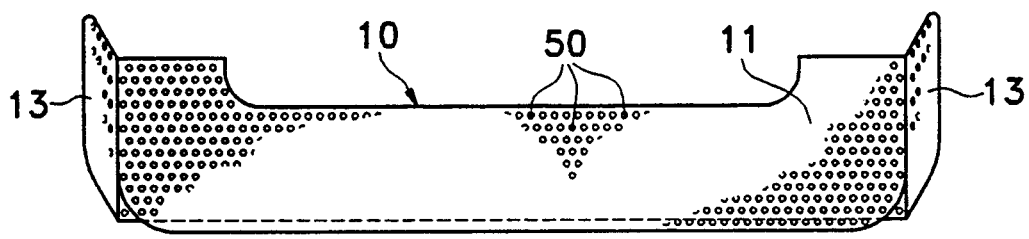
FIG. 7 is a top view of the first embodiment of the invention.

Although the upper and lower portions can be made square, the preferred embodiment has small curved cutouts in the back portion of these parts. FIG. 7 illustrates these cutouts.

Figure 11:
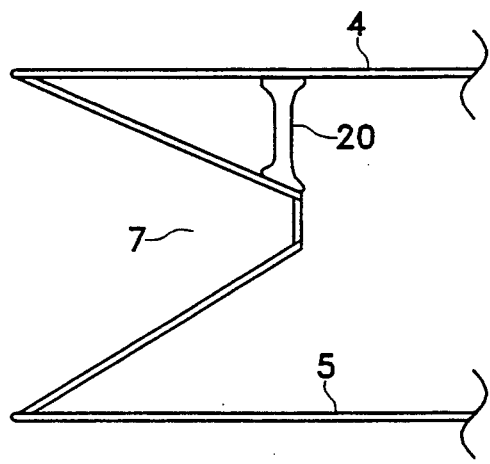
FIG. 11 is a representational view of the second embodiment installed in a crab trap.

The second embodiment is simpler in construction. It is simply a curved long piece of plastic that is shaped to fit the upper tunnel portion of the crab pot. This embodiment 20 is basically a flat shield 21 with curved ends 22. The shield is placed in the upper portion of the tunnel as shown in FIG. 11. The shield is shaped to fit the space completely, to prevent any crab from entering the upper tunnel area.

Figure 12:
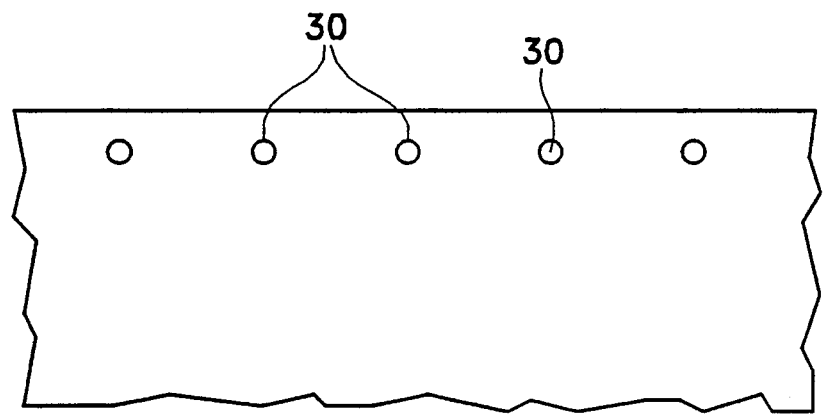
FIG. 12 is a top view of the pull tie securing holes formed in the device.
Figure 13:
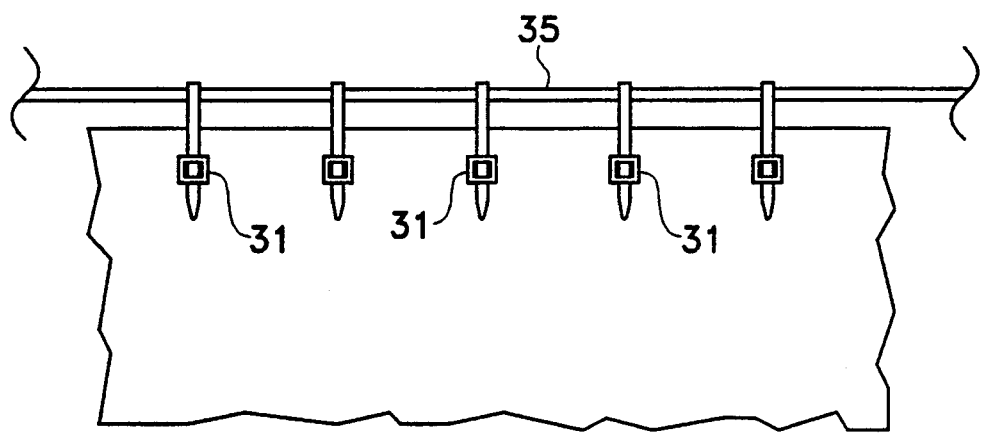
FIG. 13 is a top view of the pull ties securing a portion of the device to a crab trap.
Figure 14:
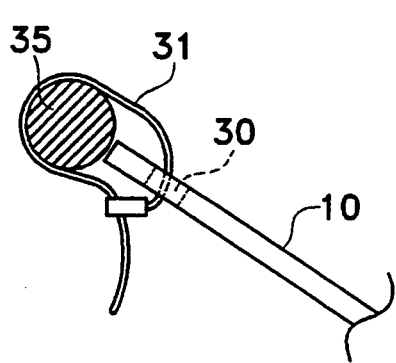
FIG. 14 is a side detail view of the pull ties securing a portion of the device to a crab trap.
Figure 15:
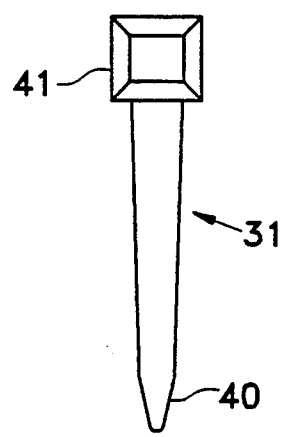
FIG. 15 is a top view of a typical tie used to secure the device to a crab pot.

Both embodiments are secured to a crab pot in the same manner. FIG. 12 shows a portion of either device. A row of holes 30 is formed in the upper and lower wall of the device. When either invention is installed, a series of pull ties 31, commonly used in the electrical industry, are used to tie the device to the metal frame 35 of a trap. The ties 31 are passed around the frame 35 and fed through the holes 30 in the device. See FIGS. 13-14. The tie is then secured by passing the free end 40 through the buckle 41 porivded on the ties 31.

Both embodiments are shown with a series of thin, elongated perforations or slots 50. These slots 50 are used to let water pass through the shields. If the slots are not provided, the create enormous drag on the pot making placement difficult.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device to prevent crab from becoming stuck in a crab trap having four walls, a top and a bottom, and having a wedge space portion having an upper part and a lower part formed between a tunnel entrance in said trap and the top of said trap, said device comprising:
    a) a shield, having a solid, unbroken, smooth surface, having an upper portion that conforms to the length and width of the upper part of the wedge space portion and a lower portion molded to conform to the length and width of the lower part of the wedge space portion, said shield being removably installed between the top of said crab pot and the tunnel entrance of said crab pot; and
    b) means to secure said shield in said crab pot.

2. The device of claim 1 wherein said means to secure said shield in said crab pot comprise electrical wire ties placed through holes provided in said shield.

3. The device of claim 1 wherein said shield has curved edges to provide additional strength.

4. The device of claim 1 further comprising a plurality of thin slot means cut into said shield to permit water to pass through said shield.

5. A device to prevent crab from becoming stuck in a crab trap having four walls, a top and a bottom and having a wedge space portion formed between a tunnel entrance in said trap and the top of said trap, said wedge space having a rectangular opening at one end, said device comprising:
    a) a shield, having a solid, unbroken, smooth surface, and being molded to conform to the rectangular opening existing in said crab pot between the top of said crab pot and the tunnel entrance of said crab pot, such that said shield completely covers said rectangular opening; and
    b) means to secure said shield in said crab pot.

6. The device of claim 5 wherein said means to secure said shield in said crab pot comprise electrical wire ties placed through holes provided in said shield.

7. The device of claim 6 wherein said shield has curved edges to provide additional strength.

8. The device of claim 6 further comprising a plurality of thin slot means cut into said shield to permit water to pass through said shield.

9. A method of preventing crab from becoming stuck in a crab trap having four walls, a top and a bottom and having a wedge space portion formed between a tunnel entrance in said trap and the top of said trap, said method comprising the steps of:
    a) placing a shield, having a solid, unbroken surface, having an upper portion that conforms to the length and width of the upper part of the wedge space portion and a lower portion molded to conform to the length and width of the lower part of the wedge space portion between the top of said crab pot and the tunnel entrance of said crab pot; and
    b) securing said shield in said crab pot to prevent said shield from becoming dislodged.

10. The method of claim 9 wherein the step of securing said shield in said crab pot comprises tying the shield to the crab pot with electrical wire ties placed through holes provided in said shield.

11. A method of preventing crab from becoming stuck in a crab trap having four walls, a top and a bottom and having a wedge space portion formed between a tunnel entrance in said trap and the top of said trap, said wedge space having a rectangular opening at one end, said method comprising the steps of:
    a) placing a shield having a solid, unbroken, smooth surface, and being molded to conform to the rectangular opening existing in said crab pot between the top of said crab pot and the tunnel entrance of said crab pot, such that said shield completely covers said rectangular opening between the top of said crab pot and the tunnel entrance of said crab pot; and
    b) securing said shield in said crab pot to prevent said shield from becoming dislodged.

12. The method of claim 11 wherein the step of securing said shield in said crab pot comprises tying the shield to the crab pot with electrical wire ties placed through holes provided in said shield.

* * * * *